United States Patent [19]

Miyagawa

[11] Patent Number: 4,749,015
[45] Date of Patent: Jun. 7, 1988

[54] NON-SKID DEVICE FOR TIRES

[76] Inventor: Yoshihiro Miyagawa, 1932 Yamaguchi, Tokorozawa-shi, Saitama-ken, Japan

[21] Appl. No.: 879,971

[22] Filed: Jun. 30, 1986

[51] Int. Cl.⁴ .................... B60C 27/06; B60C 11/01; B60C 11/14
[52] U.S. Cl. ................. 152/213 A; 152/211; 152/218; 152/222; 152/242
[58] Field of Search ............. 152/222, 221, 233, 242, 152/208, 210, 211, 213 A, 217, 218

[56] References Cited

U.S. PATENT DOCUMENTS

| | | | |
|---|---|---|---|
| 4,155,390 | 5/1979 | Okamura | 152/222 |
| 4,165,774 | 8/1979 | Matsui | 152/221 |
| 4,207,939 | 6/1980 | Motosko | 152/221 |
| 4,508,151 | 4/1985 | Sepheriades et al. | 152/221 X |

*Primary Examiner*—Donald E. Czaja
*Assistant Examiner*—Thomas Bokan
*Attorney, Agent, or Firm*—Bucknam and Archer

[57] ABSTRACT

In a non-skid device for tire constituted by two parallel cable-like members, and a plurality of non-skid strips which are fabricated of a flexible resilient material and positioned in a ladder form between the two cable-like members, each of the non-skid strips is formed approximately in an L-shape as viewed from the side face thereof, and two ends of the non-skid strip are secured respectively to the cable-like members via mounting fixtures with a longer side section of the non-skid strip as a surface coming into contact with ground. The non-skid strip securely fits to the peripheral surface of the tire, and the non-skid device can be mounted on a tire easily regardless of changes in outer shape of the tire caused by tire inflation pressure and tire width.

6 Claims, 6 Drawing Sheets

NON-SKID DEVICE FOR TIRES

FIELD OF THE INVENTION

This invention relates to a non-skid device for use on a vehicle tire at the time of snow fall or the like. This invention particularly relates to a non-skid device which securely fits to various types of tires having different peripheral widths.

DESCRIPTION OF THE PRIOR ART

As non-skid devices fitted to a vehicle tire during running on a snow-covered, icy or muddy road, tire chains fabricated of a metal such as steel are generally used. However, the steel chains have the drawback that they are difficult to handle and store, and generate vibrations and noise or damage the road surface during running. Therefore, it has been proposed to use a non-skid device comprising parallel ropes or the like, and a plurality of synthetic resin or rubber non-skid strips positioned in spaced relation in a ladder form between the ropes or the like.

The conventional non-skid device of this type is advantageous in that it does not so much generate vibrations and noise or damage road surfaces, and is easy to store. However, the conventional non-skid device still has the drawback as described below.

Namely, tires have various peripheral widths. Even with the same tire, the outer diameter and width thereof change in accordance with the tire inflation pressure. However, in the conventional non-skid device, the non-skid strips are formed in a U-shaped cross-section or in a flat plate shape. Therefore, with the conventional technique, it is necessary to prepare various sizes of non-skid devices corresponding to various peripheral widths of tires, the non-skid devices are not compatible with each other, and the fittability to peripheral surfaces of tires is not good.

Also, with the non-skid device provided with flat plate-like non-skid strips, since the two ends of each non-skid strip are pulled towards the side walls of the tire and the end portions thereof are bent forcibly, large fatigue arises at the bent sections at the two end portions of the non-skid strip.

Further, with the conventional non-skid devices, it is not easy for the beginning users to correctly attach them to tires.

SUMMARY OF THE INVENTION

In view of the aforesaid drawbacks of the conventional non-skid devices, the object of the present invention is to provide a non-skid device for tire wherein the non-skid strips securely fit to peripheral surfaces of tires having somewhat different peripheral widths, the non-skid device securely and snugly fits to the pheripheral surface of a tire even when its peripheral shape changes with the tire inflation pressure and is easy to mount on the tires.

The present invention provides a non-skid device constituted by parallel ropes, and a plurality of non-skid strips fabricated of a flexible resilient material and positioned in spaced relation in a ladder form between the ropes, wherein said non-skid strips are bent approximately in an L-shape. In the present invention, the non-skid strips fit securely to the peripheral surfaces of tires even when the peripheral widths are somewhat different. Also, the non-skid device snugly fits to the tire and is securely mounted on the peripheral surface of the tire even when the peripheral shape of the tire changes due to changes in tire inflation pressure. Further, since the mounting position of the non-skid device on the tire can be adjusted easily and appropriately by utilization of the bent section between the shorter side and the longer side of each non-skid strip, it is possible to easily mount the non-skid device on the tire.

DETAILED DESCRIPTION OF PREFERRED EMBODIMENTS

The present invention will hereinafter be described in detail with reference to the accompanying drawings.

Figure 1:
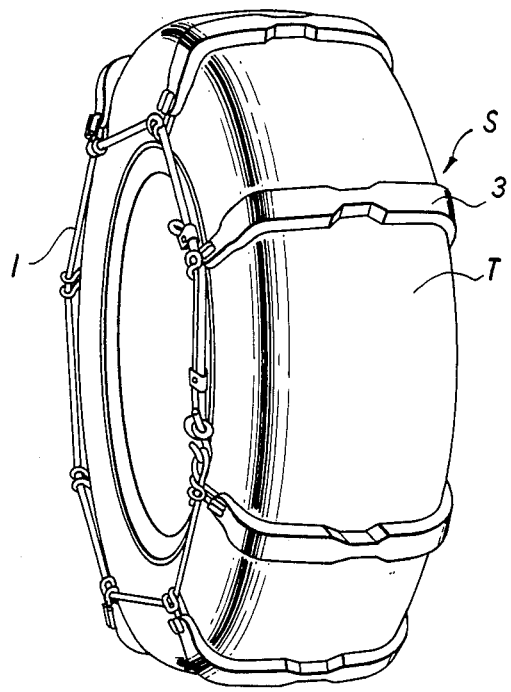
FIG. 1 is a perspective view showing the whole tire on which an embodiment of the non-skid device in accordance with the present invention is mounted.
Figure 2:
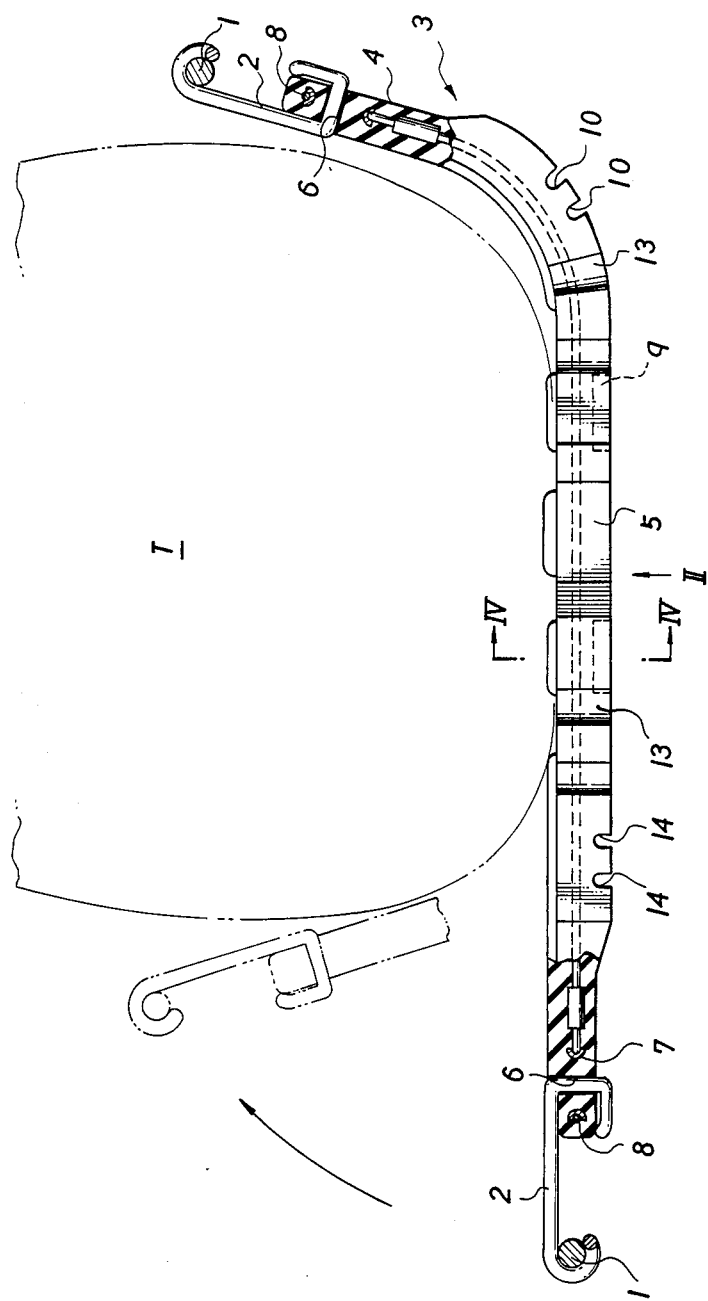
FIG. 2 is a partial sectional side view showing the non-skid strip in the embodiment of FIG. 1.
Figure 3:
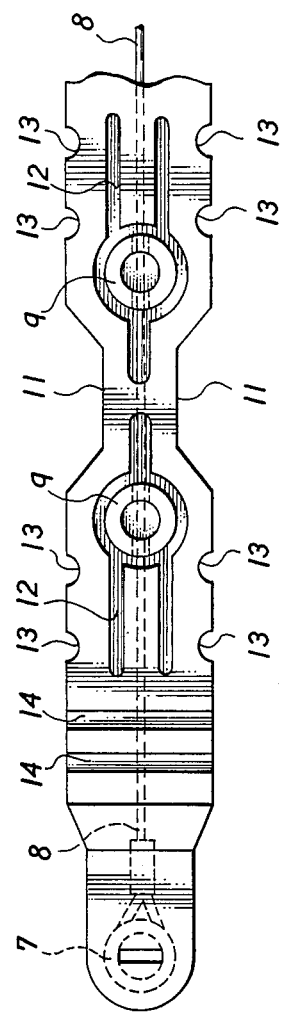
FIG. 3 is a schematic view taken in the direction as indicated by the arrow II of FIG. 2.

FIGS. 1 to 6 show an embodiment of the non-skid device in accordance with the present invention. Referring first to FIG. 1 showing the non-skid device mounted on a tire T and FIG. 2 which is a partial sectional side view of the non-skid strip constituting the non-skid device, reference numeral 1,1' denotes a pair of ropes as the cable-like members. Hooks 2,2, . . . (nine pieces in this embodiment) are caulked to each of the parallel ropes 1,1' in spaced relation to each other. A non-skid device S is constituted by mounting non-skid strips 3,3, . . . on the hooks 2,2 . . . .

Each of the non-skid strips 3,3 . . . is an integral molded product made of a flexible resilient material such as rubber to form an approximately L-shape constituted by a shorter side section 4 and a longer side section 5 as viewed from the side face. Engagement holes or orifices 6,6 are respectively formed at the end portions of the shorter side section 4 and the longer side section 5 of the non-skid strip 3. Rings 7,7 respectively surrounding the engagement holes 6,6 and a wire 8 as a strengthening member connecting the rings 7,7 with each other are integrally molded and thus embedded inside of the non-skid strip 3. The wire 8 holds spikes 9 as described later. The engagement holes 6,6 are generally formed in an approximately full-circular shape. The rubber material of the non-skid strip body is integrally extended to the semi-circular sections of the engagement holes 6,6 to prevent the non-skid strip 3 from disengaging from the hooks 2,2.

The shorter side section 4 of the non-skid strip 3 is attached to the shoulder section of the tire T. Grooves 10,10 extending in the width direction of the non-skid strip 3, i.e. in the rotating direction of the tire T, are formed on the side of the bent section coming into contact with ground.

The longer side section 5 of the non-skid strip 3 covers the tread of the tire T in the width direction of the tire T. The end portion of the longer side section 5 is forcibly bent by the pulling force of the rope 1, and made to contact the other shoulder section of the tire T. The longer side section 5 has a trapezoidal constricted section 11 at a position coming into contact with the center of the tread.

The spikes 9 are embedded in the outer side surface of the longer side section 5 coming into contact with ground respectively on opposite sides of the constricted section 11 in spaced relation by a predetermined distance from the constricted section 11. The spikes 9 are fabricated of a wear-resistant metal material in an inverted cup-like shape. The lower sections of the spikes 9 are inserted into the wire 8 and held by the longer side section 5. The outer surfaces of the spikes 9 are positioned flush with the surface of the longer side section 5 coming into contact with ground, and the aperture edges of the spikes 9 are positioned to face the road surface. Grooves 12 are respectively formed around the spikes 9 to extend in the longitudinal direction of the longer side section 5.

A plurality of semi-circular grooves 13 are formed in the thickness direction at both sides of the longer side section 5 of the non-skid strip 3. Further, grooves 14,14 similar to the grooves 10 of the shorter side section 4 are formed on the end portion side of the longer side section 5.

The removable non-skid strip 3 is mounted on the ropes 1 by engagement of the rings 7 around the engagement holes 6 with the hooks 2 of the ropes 1.

Figure 6:
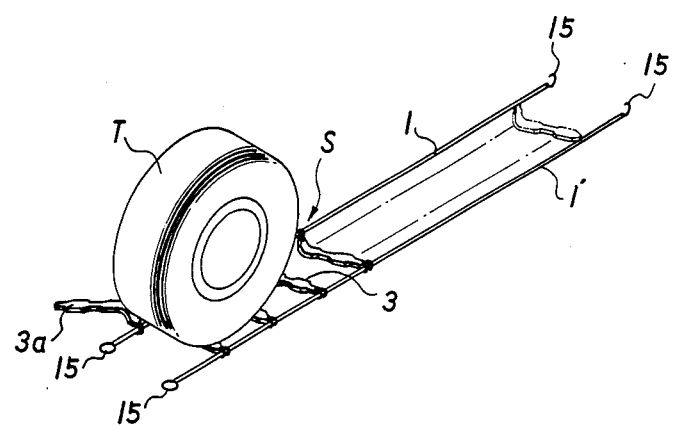
FIG. 6 is an explanatory view showing the method of mounting the non-skid device.

In FIG. 6, reference numerals 15 denote engagement members mounted on both ends of respective ropes 1 for mounting the non-skid device S.

The non-skid device S constituted as described above is mounted on the tipe T as shown in FIG. 6.

Specifically, first, one end of an outermost non-skid strip 3a is disengaged from the hook 2. The non-skid device S is placed on the road surface so that a tire T is positioned in the space generated by disengagement of the non-skid strip 3a between ropes 1,1'. Then, the non-skid strip 3a is engaged with the hook 2 and mounted on the rope. The section of the non-skid device S extending rearwardly in FIG. 6 is applied to the peripheral surface of the tire T from the rear of the tire T, and the two ends of the rope 1 positioned on the inner side of the tire T are engaged with each other. In this condition, the shorter side section 4 of each non-skid strip 3 is securely fitted to the inner shoulder of the tire T. Finally, the two ends of the outer rope 1' are engaged with each other. At this time, the end portion of the longer side section of each non-skid strip 3 is pulled by the rope 1', bent to contact the outer shoulder of the tire T, and is snugly fitted to the peripheral surface of the tire T so that no space is left therebetween as shown in FIG. 1. Therefore, the inner side surface of the non-skid strips would be contacting the peripheral surface of the tire T. Bending of the two end portions of each non-skid strip 3 is effected appropriately by the grooves 10 and grooves 14 formed at the longer side section 5.

The non-skid device S of the present invention may also be mounted in a different method, for example, by moving the tire T onto the non-skid strips in the same manner as for the conventional devices of this type.

Figure 8A:
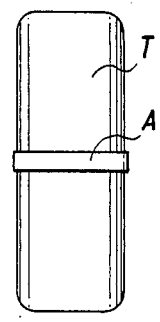
FIGS. 8a and 8b are explanatory views showing the twisted condition of the conventional non-skid strip.
Figure 8B:
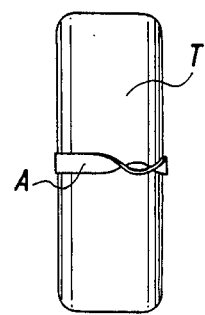

In general, the non-skid strip 3 are subject to large twisting force by friction with the road surface when the vehicle provided with the non-skid device of this type is stopped or accelerated. In this case, with the conventional non-skid devices, since the section of each non-skid strip coming into contact with ground merely has a plate-like shape having a uniform width as shown in FIGS. 8a and 8b, the section A contacting ground is twisted by friction, and the tread pattern formed on the surface of the section coming into contact with ground become useless. Also, the reinforcement wire integrally molded inside of the non-skid strip is subject to excessive force and breaks. As a result, the non-skid strip breaks.

Figure 7A:
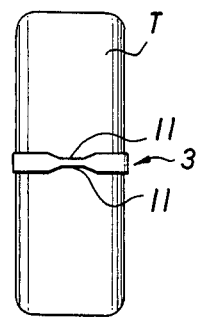
FIGS. 7a and 7b are explanatory views showing the bent condition of the non-skid strip.
Figure 7B:
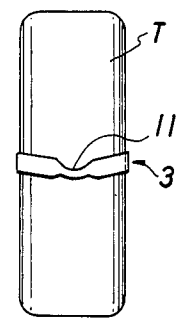

However, in the non-skid device S of the present invention, since the non-skid strip 3 is fabricated of a flexible resilient material and has the constricted section 11 at the center of the ground-contacting section of the longer side section 5, the aforesaid twisting force is absorbed as a horizontal bending deflection of the non-skid strip 3 with the bending point at the constricted section 11 causing the trapezoidal constricted section to deform to essentially curved configuration as shown in FIGS. 7a and 7b. Therefore, with the non-skid device S of the present invention, each non-skid strip 3 is not twisted in the aforesaid case, and gripping characteristics are securely obtained by the grooves 10, 12, 14, or the like formed on the ground-contacting surface.

Figure 4:
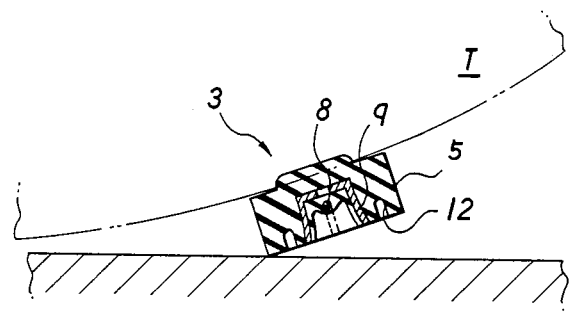
FIG. 4 is a sectional view taken along line IV—IV of FIG. 2.
Figure 5:
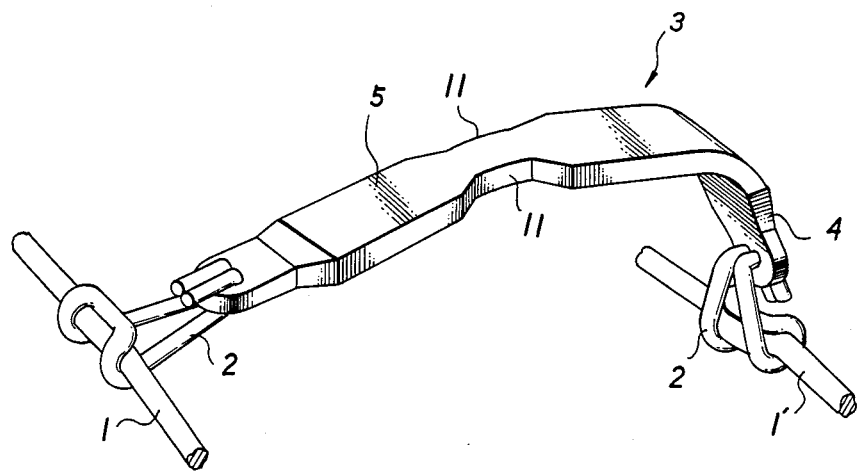
FIG. 5 is a perspective view showing the non-skid strip in the embodiment of FIG. 1.

The gripping characteristics will be described in detail below. First, the non-skid strip 3 positioned between the tire T and the road surface during running as shown in FIG. 4 receives a pressure and deformed in such a direction that the grooves 12 around the spikes 9 open. Therefore, the ends of the spikes 9 are protruded appropriately from the ground-contacting surface of the non-skid strip 3, catch the road surface, and exhibit the non-skid effect. Thus, the road surface is not damaged by excessive protrusion of the spikes 9. Also, when the tire T slides laterally, the grooves 10,10 and grooves 14 formed at two ends of the non-skid strip 3 resist against the load surface and prevent the tire T from sliding laterally.

Further, with the non-skid device S of the present invention, since vertical grooves 13 are formed at side edges of the non-skid strip 3 and since the constricted section 11 is provided, the entire side edges of the non-skid strip 3 are prevented from colliding with the road surface. Thus shocks are dispersed, vibrations are prevented, and good riding comfort is obtained.

The present invention is not limited to the case where each removeable non-skid strip is mounted on the hooks secured to the ropes, and the non-skid strip may also be secured to the hooks. However, when the removeable non-skid strip is mounted on the hooks as in the aforesaid embodiment, it becomes possible to replace only the damaged non-skid strip. Thus the aforesaid embodiment is advantageous from economical viewpoint of the entire device.

Also, the present invention is not limited to the case where rubber is used as the flexible resilient material. For example, a soft plastic material may also be used for this purpose.

I claim:

1. A non-skid device for a tire which comprises two parallel cable members, a plurality of non-skid strips made of a flexible resilient material and positioned in a ladder form between said two cable members, said strips having two ends, each of said strips having essentially an L shape with a longer side section and a shorter side section, means for mounting said two ends of each of said strips to said cable members, each of said longer side section having an outer side and an inner side, said outer side being the surface coming into contact with the ground, the shorter side section being attached to the shoulder section of said tire, wherein each of said strips has a trapezoidal constricted section (11) in the width direction of the strip, located wholly and essentially in the middle of said longer side section, whereby when said device is mounted on the tire, said constricted section is in contact with the center of the tread of said tire, and during operation, due to friction with the road surface, said trapezoidal constricted section is deformed to an essentially curved configuration.

2. The device according to claim 1 wherein each shorter side section and each of said longer side section of each of said strips has at the end thereof orifices (6,6), rings surrounding said orifices and within each strip a wire (8) connecting said rings, said wire being embedded from one end to the other end of said strip.

3. The device according to claim 2 wherein each of said shorter side section has grooves (10) extending in the width direction at the side of a bent section on the side coming in contact with the ground.

4. The device according to claim 3 which has spikes embedded in the surface of each of said longer side section coming in contact with the ground, said spikes being inserted into said wire (8) when the device is mounted on the tire.

5. The device according to claim 4 which has grooves (12) around said spikes extending in the longitudinal direction of each of said longer side section.

6. The device according to claim 1 wherein each of said strips is integrally molded.

* * * * *